US010843731B2

(12) United States Patent
Iwami et al.

(10) Patent No.: US 10,843,731 B2
(45) Date of Patent: Nov. 24, 2020

(54) DEVICE FOR ASSISTING A VEHICLE WITH EXITING A PARKING SPACE

(71) Applicants: HONDA MOTOR CO., LTD., Tokyo (JP); AISIN SEIKI KABUSHIKI KAISHA, Kariya (JP)

(72) Inventors: Hiroshi Iwami, Wako (JP); Hiroki Inagaki, Okazaki (JP); Hironori Hirata, Anjo (JP); Masahiro Ishihara, Nishio (JP)

(73) Assignees: Honda Motor Co., Ltd., Tokyo (JP); Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 15/689,107

(22) Filed: Aug. 29, 2017

(65) Prior Publication Data

US 2018/0057057 A1 Mar. 1, 2018

(30) Foreign Application Priority Data

Aug. 31, 2016 (JP) ................................. 2016-169393

(51) Int. Cl.
*B62D 15/02* (2006.01)
*B60W 30/06* (2006.01)
*B60W 40/02* (2006.01)
*B60W 50/00* (2006.01)

(52) U.S. Cl.
CPC ......... *B62D 15/0285* (2013.01); *B60W 30/06* (2013.01); *B60W 40/02* (2013.01); *B62D 15/028* (2013.01); *B60W 2050/007* (2013.01)

(58) Field of Classification Search
None
See application file for complete search history.

(56) References Cited

U.S. PATENT DOCUMENTS

| 8,560,175 B2 * | 10/2013 | Bammert ........... B62D 15/0285 701/41 |
| 9,751,562 B2 | 9/2017 | Yamashita et al. |
| 2004/0260439 A1 * | 12/2004 | Endo .................. B62D 15/0285 701/36 |
| 2009/0259365 A1 | 10/2009 | Rohlfs et al. |

(Continued)

FOREIGN PATENT DOCUMENTS

| CN | 105416275 A | 3/2016 |
| DE | 10 2006 046 055 A1 | 4/2008 |

(Continued)

OTHER PUBLICATIONS

Office Action issued in co-pending U.S. Appl. No. 15/689,128, dated Dec. 14, 2018.

(Continued)

*Primary Examiner* — Adam D Tissot
*Assistant Examiner* — Laura E Linhardt
(74) *Attorney, Agent, or Firm* — Carrier Blackman & Associates, P.C.; Joseph P. Carrier; Jeffrey T. Gedeon

(57) ABSTRACT

At a time when it is possible for a user's own vehicle to pull out from a parking space, an assist control unit of a parking exit assist device terminates an assist control in the event that the user's own vehicle has traveled forward by a predetermined distance (a minimum forward distance) from a predetermined position (a most recent intermediate position or an assist starting position).

3 Claims, 12 Drawing Sheets

(56) References Cited

U.S. PATENT DOCUMENTS

| | | | |
|---|---|---|---|
| 2014/0200769 A1 | 7/2014 | Noh | |
| 2016/0107690 A1* | 4/2016 | Oyama | B62D 5/046 701/41 |
| 2017/0129537 A1* | 5/2017 | Kim | G05D 1/0011 |
| 2017/0229020 A1 | 8/2017 | Colella et al. | |
| 2017/0297624 A1* | 10/2017 | Noh | G08G 1/143 |
| 2018/0299900 A1* | 10/2018 | Bae | G06K 9/6202 |

FOREIGN PATENT DOCUMENTS

| | | |
|---|---|---|
| DE | 10 2007 036 251 A1 | 2/2009 |
| DE | 10 2008 025 219 A1 | 12/2009 |
| EP | 2 230 155 A1 | 9/2010 |
| JP | 2014-004933 A | 1/2014 |
| JP | 2014-121984 A | 7/2014 |
| JP | 2015-014955 A | 1/2015 |

OTHER PUBLICATIONS

Extended European search report dated Jan. 24, 2018 issued over the corresponding EP Patent Application 17188621.1.
Extended European search report dated Jan. 31, 2018 issued over the corresponding EP Patent Application 17188623.7 of co-pending U.S. Appl. No. 15/689,128.
Office Action dated Jun. 4, 2019 issued over corresponding Chinese Patent Application No. 201710756405.1 with the English translation thereof.
Office Action dated Sep. 20, 2019 issued in co-pending U.S. Appl. No. 15/689,128.
Office Action dated Dec. 3, 2019 issued over the corresponding Japanese Patent Application No. 2016-169393 with the English translation thereof.

* cited by examiner

DEVICE FOR ASSISTING A VEHICLE WITH EXITING A PARKING SPACE

CROSS-REFERENCE TO RELATED APPLICATION

This application is based upon and claims the benefit of priority from Japanese Patent Application No. 2016-169393 filed on Aug. 31, 2016, the contents of which are incorporated herein by reference.

BACKGROUND OF THE INVENTION

Field of the Invention

The present invention relates to a parking exit assist device configured to assist a vehicle in pulling out from a parking space.

Description of the Related Art

Conventionally, a parking exit assist device has been known that assists a vehicle in pulling out from a parking space. For example, in the case of pulling out or exiting from a parallel parking space, a technology has been developed for assisting in a turning back operation of a user's own vehicle, by performing a control to automatically change the steering angle of a vehicle (hereinafter referred to as a user's own vehicle) which serves as an object that is exiting from parking.

In Japanese Laid-Open Patent Publication No. 2014-121984, a parking exit assist device is proposed in which, in the case it is determined that a user's own vehicle is capable of exiting from parking, an assist control is terminated after performing an increased-steering-angle control by increasing a target steering angle. In accordance therewith, it is disclosed that after the responsibility for driving has been handed over to the driver, even if a return occurs associated with a steering characteristic upon release of the hands from the steering wheel, the target steering angle can be assured by an amount corresponding to the increased steering angle.

SUMMARY OF THE INVENTION

Incidentally, from the standpoint of merchantability, in the case of pulling out from a parallel parking space, in relation to handing over responsibility for driving to the driver, it is desirable for the assist control to be terminated with a shift position in a forward traveling direction, such as "D" (drive range), "2" (second range), or "L" (low range). For example, in the case that a time, at which the user's own vehicle avoids a front obstacle, and when it is determined that exiting from parking is possible, is set to the timing of termination of the assist control, with respect to the relationship between termination of the assist control and the position of the user's own vehicle, the following disadvantages may occur.

Even if it is determined by a front detection means such as a sonar device or the like that exiting from parking is possible when the front obstacle cannot be detected within the detection range of the front detection means, if the shift position is "R" (reverse range), the assist control is not terminated. In such a state, when the assist control is terminated at the moment that the shift position is switched to a shift position in the forward traveling direction, the driver feels that the change in the shift position is not made by the intention of the driver, but rather was forcibly operated by the parking exit assist device that is mounted on the user's own vehicle.

In order to avoid such a feeling of annoyance by the driver, it may be considered to terminate the assist control at a point in time when the user's own vehicle has been retracted to a certain extent in the rearward direction, and then it is determined that exiting from parking is possible. In this case, although the feeling of annoyance is alleviated, since the assist control is terminated with the "R" shift position, it is necessary for the driver to make a change in the shift position to the forward direction. As a result, the driver feels that ease of use is adversely affected.

In this manner, with the conventional parking exit assist device, there is a problem in that the affinity between the driver and the parking exit assist device decreases.

The present invention has been devised with the aim of solving the aforementioned problems, and has the object of providing a parking exit assist device, in which it is possible to reduce a feeling of annoyance experienced by the driver, and to improve the affinity between the driver and the parking exit assist device, whereby it becomes possible to smoothly hand over control of driving to the driver.

A parking exit assist device according to the present invention comprises a front detection unit configured to detect at least a frontward distance from a user's own vehicle to a front obstacle in front of the user's own vehicle, a target steering angle setting unit configured to set a target steering angle of the user's own vehicle on a basis of the frontward distance detected by the front detection unit and a position of the user's own vehicle, and an assist control unit configured to carry out an assist control in which a steering angle of the user's own vehicle is changed to the target steering angle set by the target steering angle setting unit, wherein the assist control unit is configured to terminate the assist control in an event that the user's own vehicle has traveled forward by a predetermined distance from a predetermined position at a time that the user's own vehicle is capable of exiting from parking.

In this manner, in the event that the user's own vehicle is capable of exiting from parking, the assist control is terminated when the user's own vehicle has traveled forward from the predetermined position by the predetermined distance. Consequently, according to the present invention, since the assist control is necessarily terminated after having traveled forward from the predetermined position, an immediate termination of the assist control triggered by an operation of the shift position can be avoided. As a result, it is possible to improve the affinity between the driver and the parking exit assist device while also reducing the driver's feeling of annoyance, and further, after completion of the assist control, it is possible to smoothly hand over the responsibility for driving to the driver from the parking exit assist device.

Further, when the user's own vehicle has traveled forward from the predetermined position by the predetermined distance, the assist control unit may be configured to terminate the assist control in a case where the front detection unit cannot detect the frontward distance, or in a case where the detected frontward distance exceeds a predetermined threshold value. In accordance with this feature, it is possible to terminate the assist control while confirming a condition of safety in front of the user's own vehicle when exiting from parking.

Further, the parking exit assist device may further comprise an assist continuation determining unit configured to determine to terminate the assist control, in an event it was determined to continue the assist control by the assist control unit, and the user's own vehicle has traveled forward from the predetermined position by the predetermined distance. In this case, the predetermined position may be an assist starting position, which is a position of the user's own vehicle at a time that the assist control is started, or may be a most recent turning back position in a case that the user's own vehicle performs a turning back operation.

Further, the assist continuation determining unit may be configured to set the predetermined distance on a basis of the assist starting position, a position of a lane into which the user's own vehicle exits from parking and merges with, and the position of the user's own vehicle. In accordance with this feature, the assist control can be terminated after having brought about an optimum condition for exiting from parking, and at this time, the responsibility for driving can be handed over to the driver.

Further, the assist continuation determining unit may be configured to set the predetermined distance to be shorter as an angular difference between an orientation of the user's own vehicle at the assist starting position and an orientation of the user's own vehicle at a current position of the user's own vehicle becomes greater, or as an angular difference of the orientation of the user's own vehicle at the current position of the user's own vehicle with respect to the lane becomes greater. When the angular difference increases, it becomes more difficult for the user's own vehicle to merge with the lane, and therefore, by setting the predetermined distance to be shorter as the angular difference becomes larger, it is made easier for the user's own vehicle to merge with the lane.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a parking exit assist device according to the present invention will be described in detail below with reference to the accompanying drawings.
[Configuration of Parking Exit Assist Device 12]
<Configuration of User's Own Vehicle 10>

Figure 1:
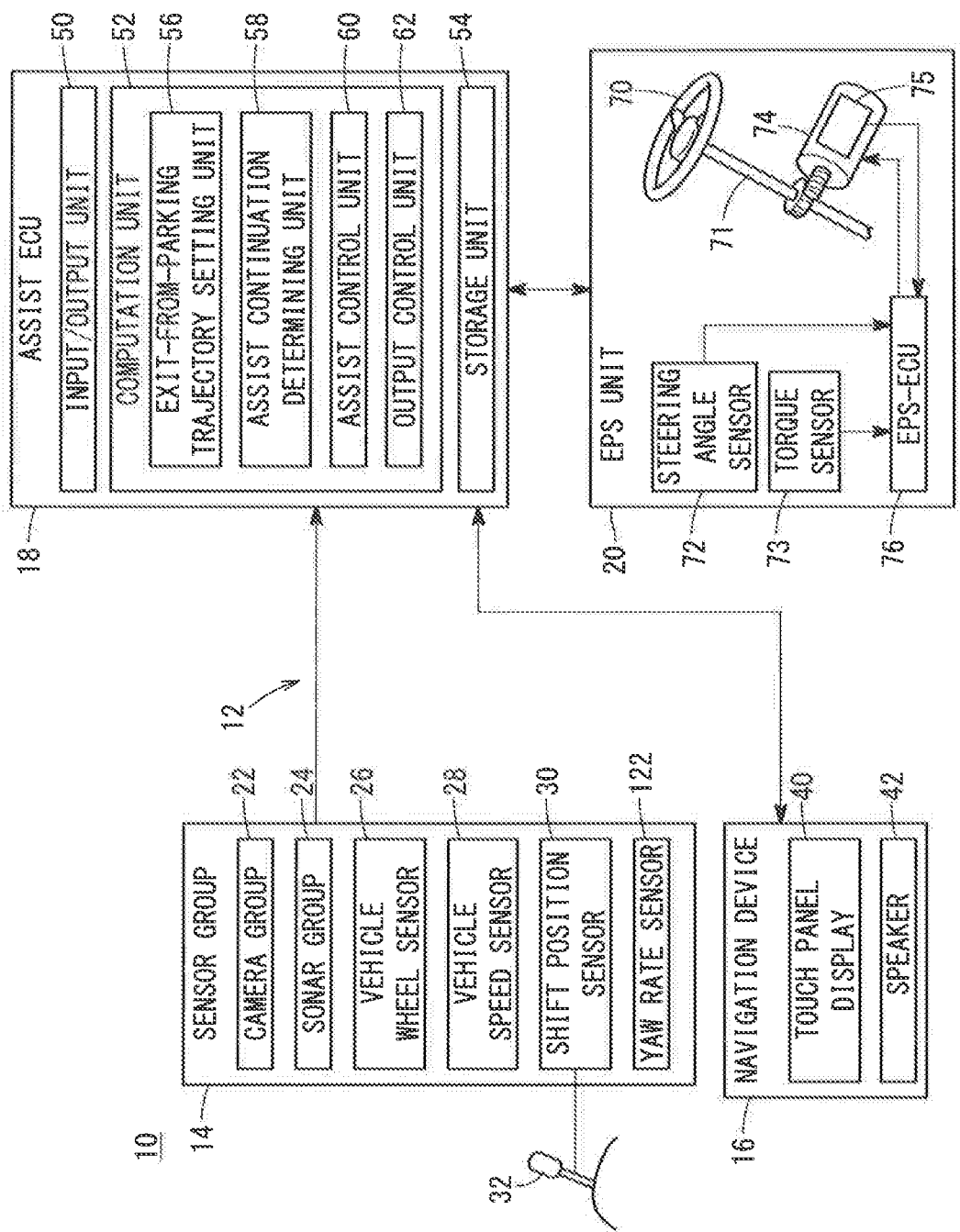
FIG. 1 is a block diagram showing a configuration of a user's own vehicle equipped with a parking exit assist device according to an embodiment of the present invention.

FIG. 1 is a block diagram showing a configuration of a user's own vehicle 10 equipped with a parking exit assist device 12 according to an embodiment of the present invention.

The parking exit assist device 12 is a device that assists in pulling out of the user's own vehicle 10 from a parking space in accordance with automatic steering, by performing an assist control including a parking exit (PO; Pull Out) assist control. In this instance, operation of a steering wheel 70 is carried out automatically by the parking exit assist device 12, whereas operations of the accelerator pedal and the brake pedal (neither of which is shown) as well as a shift lever 32 are performed by the driver of the user's own vehicle 10.

The parking exit assist device 12 is equipped with a sensor group 14 that detects various physical quantities used in the assist control, a navigation device 16, an ECU (Electronic Control Unit, hereinafter referred to as an assist ECU 18) that administers the assist control, and an electric power steering system unit (hereinafter referred to as an EPS unit 20).

As shown in FIG. 1, the sensor group 14 includes a camera group 22, a sonar group 24, a vehicle wheel sensor 26, a vehicle speed sensor 28, a shift position sensor 30, and a yaw rate sensor 122, to be described later.

The camera group 22 is made up from one or a plurality of cameras capable of capturing images of the surrounding periphery of the user's own vehicle 10, and sequentially outputs captured image signals indicative of peripheral images of the user's own vehicle 10. The sonar group 24 is made up from one or a plurality of sonar devices capable of emitting sound waves and receiving reflected sounds from other objects, and sequentially outputs detection signals correlated with a distance Dis from the user's own vehicle 10.

The vehicle wheel sensor 26 is an angle sensor or a displacement sensor that detects angles of rotation of the left and right front wheels and/or the left and right rear wheels (none of which are shown), and outputs a number of detection pulses correlated with a travel distance of the user's own vehicle 10. The vehicle speed sensor 28 is a sensor that detects a speed (i.e., a vehicle speed) of the user's own vehicle 10, and is configured to be capable of detecting the vehicle speed, for example, from an amount of rotation of a non-illustrated drive shaft of a transmission.

The shift position sensor 30 outputs a detection signal indicative of a shift position selected in accordance with operation of the shift lever 32 (also referred to as a selector). The shift lever 32, for example, is a device that enables selection of any one type from among six types of shift positions, including "P" (parking range), "R", "N" (neutral range), "D", "2", or "L".

The navigation device 16 detects the current position Pc (see FIG. 6) of the user's own vehicle 10 using a GPS (Global Positioning System), and provides guidance to a vehicle occupant including the driver along a route to a destination point. The navigation device 16 includes a touch panel display 40, a speaker 42, and a storage device (not shown) in which a map information database is constructed. The navigation device 16 functions as an HMI (Human-Machine Interface) in the parking exit assist device 12.

The assist ECU 18 includes as hardware components thereof an input/output unit 50, a computation unit 52, and a storage unit 54. The computation unit 52, by reading out and executing programs stored in the storage unit 54, functions as an exit-from-parking trajectory setting unit 56 (target steering angle setting means), an assist continuation determining unit 58 (assist continuation determining means), an assist control unit 60 (assist control means), and an output control unit 62.

The EPS unit 20 is configured to include the steering wheel 70, a steering column 71, a steering angle sensor 72, a torque sensor 73, an EPS motor 74, a resolver 75, and an EPS-ECU 76.

The steering angle sensor 72 detects the steering angle θ (see FIG. 12) of the steering wheel 70. The torque sensor 73 detects a torque applied to the steering wheel 70. The EPS motor 74 applies a driving force or a reaction force to the steering column 71 which is connected to the steering wheel 70. The resolver 75 detects an angle of rotation of the EPS motor 74.

The EPS-ECU 76 is a device adapted to control the EPS unit 20 in its entirety, and similar to the assist ECU 18, includes as hardware components thereof an input/output unit, a computation unit, and a storage unit (none of which are shown).

<Detailed Configuration of Camera Group 22 and Sonar Group 24>

Figure 2:
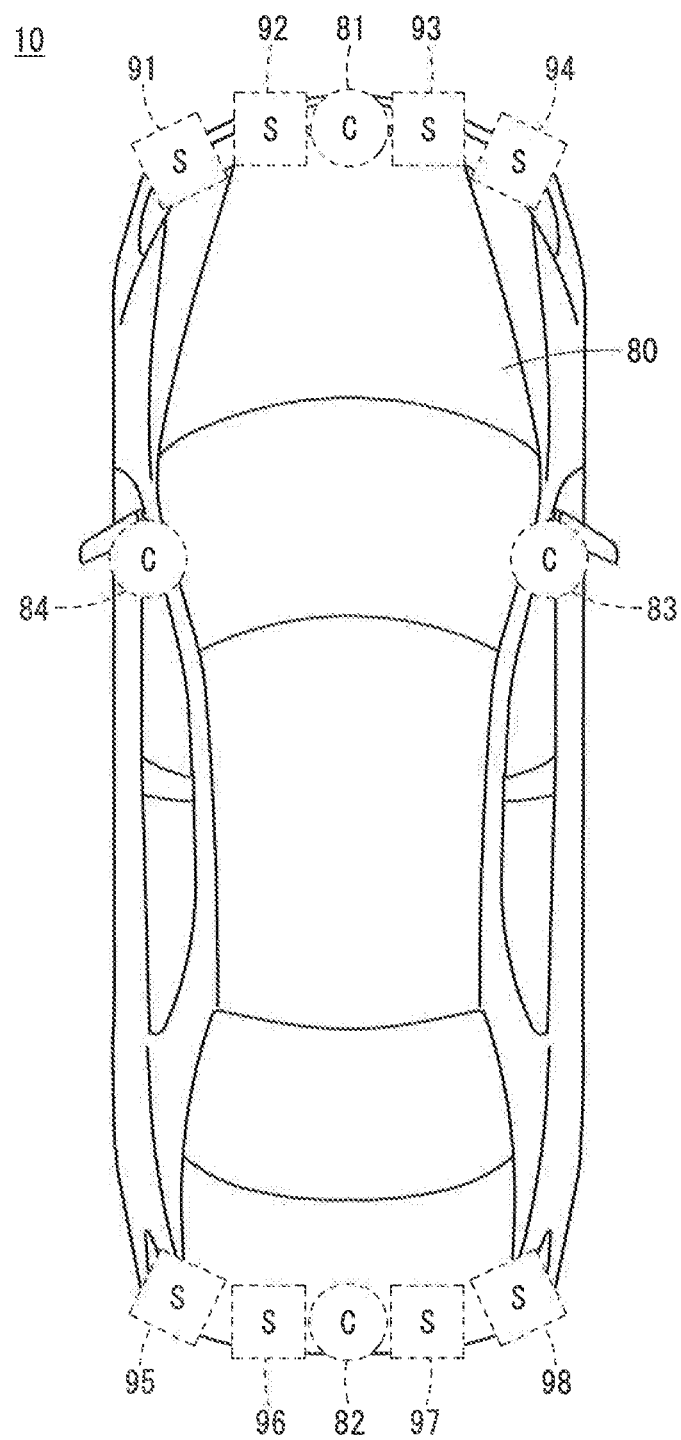
FIG. 2 is a schematic plan view showing an exemplary arrangement of a camera group and a sonar group on the user's own vehicle of FIG. 1.

FIG. 2 is a schematic plan view showing an exemplary arrangement of the camera group 22 and the sonar group 24 on the user's own vehicle 10 of FIG. 1. For example, the camera group 22 is made up from four cameras including a front camera 81 at the front of a vehicle body 80, a rear camera 82 at the rear of the vehicle body 80, a right side camera 83 on a lower outer side of the driver's seat side door mirror, and a left side camera 84 on a lower outer side of the passenger seat side door mirror.

The sonar group 24 is constituted by four front sonar devices 91 to 94 (front detection unit, front detection means) at the front of the vehicle body 80, and four rear sonar devices 95 to 98 (rear detection unit, rear detection means) at the rear of the vehicle body 80. The front sonar devices 92, 93 and the rear sonar devices 96, 97 are disposed at positions close to the center line of the vehicle body 80, and are arranged respectively in directions that coincide with the vehicle longitudinal direction. The front sonar devices 91, 94 and the rear sonar devices 95, 98 are disposed at positions remote from the center line of the vehicle body 80, and are arranged respectively in directions that are inclined outwardly with respect to the vehicle longitudinal direction.

Figure 3:
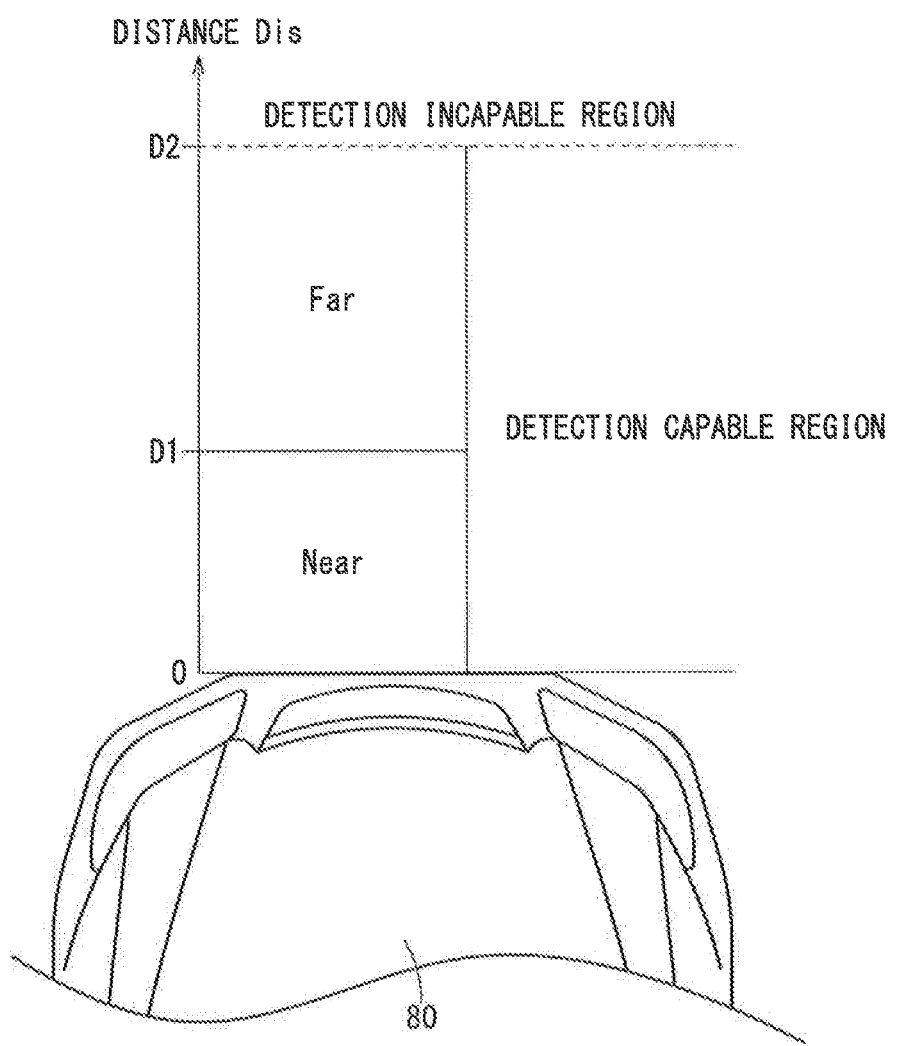
FIG. 3 is a schematic diagram showing detection results by front sonar devices shown in FIG. 2.

FIG. 3 is a schematic diagram showing detection results by the front sonar devices 91 to 94 shown in FIG. 2. In the present drawing, the front sonar devices 92, 93, which are disposed in directions coinciding with the vehicle longitudinal direction of the vehicle body 80, are exemplified.

Depending on a distance Dis from the front sonar devices 91 to 94, the assist ECU 18 (computation unit 52) carries out a detection process by classifying the distance Dis into three distance regions. For example, in the case that another object can be detected within a distance region satisfying the inequality 0<Dis<D2, such a distance region is defined as a "detection capable region". On the other hand, in the case that another object cannot be detected in a distance region satisfying the inequality Dis>D2, such a distance region is defined as a "detection incapable region".

In this instance, the above-described "detection capable region" is further classified into two distance regions. More specifically, in the case that the inequality 0<Dis≤D1 (<D2) is satisfied, such a distance region is defined as "near" (or a "near region"). On the other hand, in the case that the inequality D1<Dis (≤D2) is satisfied, such a distance region is defined as "far" (or a "far region").

[Operations of Parking Exit Assist Device 12]

<Outline of Parking Exit Assist Control>

The parking exit assist device 12 according to the present embodiment is constituted as described above. Responsive to a driver's input operation via the navigation device 16 (see FIG. 1), the parking exit assist device 12 transitions into a "parking exit assist control mode", as will be described later with reference to FIG. 5, and initiates the parking exit assist control with respect to the user's own vehicle 10. During execution of the parking exit assist control, the navigation device 16 performs a guidance output (hereinafter, referred to simply as guidance) in relation to the parking exit assistance. More specifically, in accordance with the output control by the output control unit 62, visual information (a screen) in relation to the parking exit assistance is output to the touch panel display 40, and together therewith, audio information in relation to the parking exit assistance is output to the speaker 42.

Figure 4:
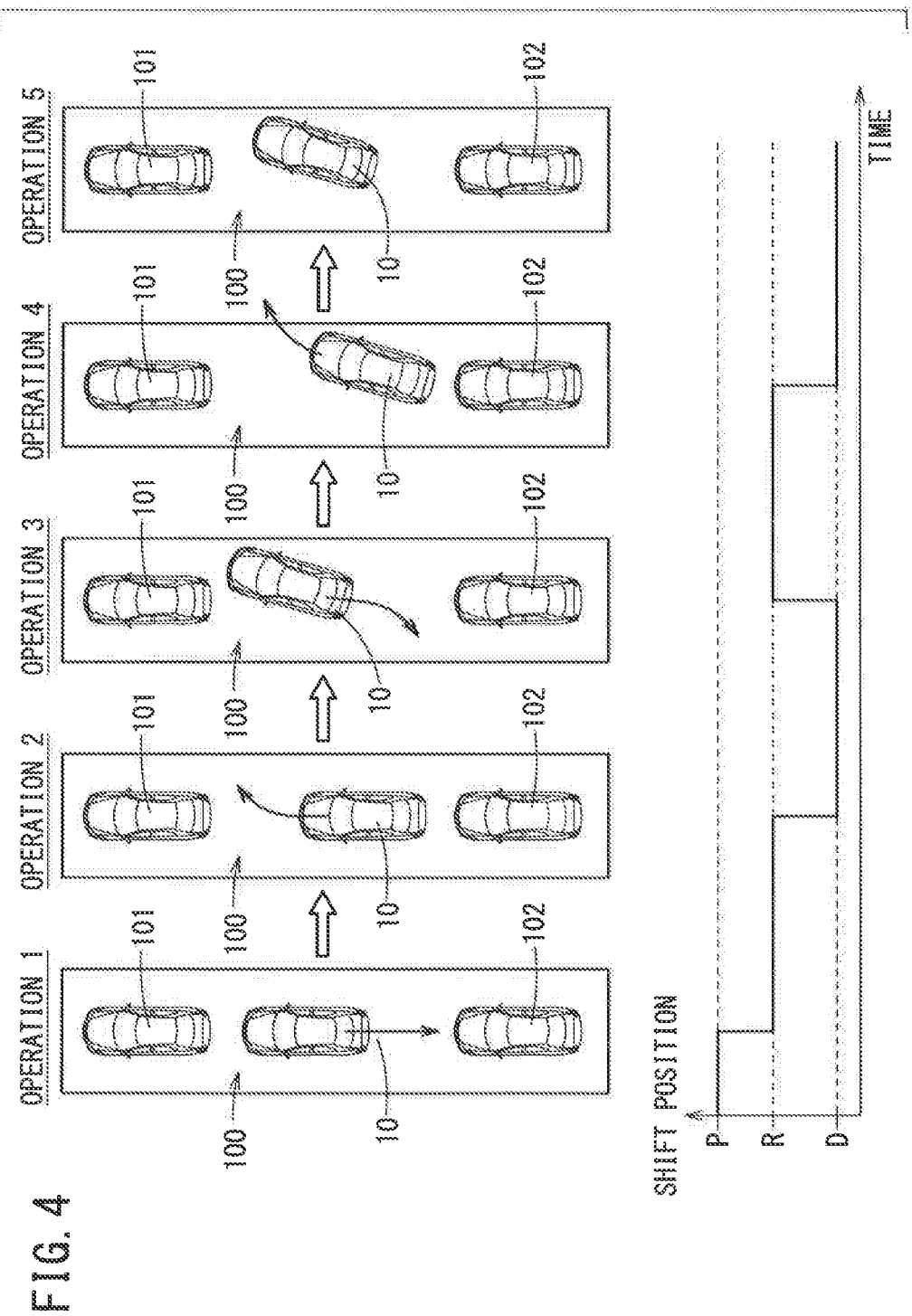
FIG. 4 is a schematic diagram showing a series of operations of the user's own vehicle in accordance with a parking exit assist control.

FIG. 4 is a schematic diagram showing a series of operations of the user's own vehicle 10 in accordance with the parking exit assist control. In this instance, it is assumed that another front vehicle 101 (front obstacle), the user's own vehicle 10, and another rear vehicle 102 are parked in a row in a parallel parking space 100.

In "OPERATION 1", the assist ECU 18 supplies an output signal to the navigation device 16 in order to carry out a rearward operation (a departure command and a stop command) of the user's own vehicle 10. In accordance with guidance provided by the navigation device 16, the driver operates the shift lever 32 to change the shift position from "P" to "R" and thereafter releases the brake pedal. In this instance, since the steering angle θ is set to a neutral angle θo (=0 degrees), the user's own vehicle 10 moves straight backward under the action of a creep force. A detection of "near" by the rear sonar devices 95 to 98 acts as a trigger, and in accordance with guidance provided by the navigation device 16, the driver performs an operation to depress the brake pedal.

In "OPERATION 2", the assist ECU 18 supplies an output signal to the navigation device 16 in order to carry out a forward operation (a departure command and a stop command) of the user's own vehicle 10. In accordance with guidance provided by the navigation device 16, the driver operates the shift lever 32 to change the shift position from "R" to "D" and thereafter releases the brake pedal. In this instance, since the steering angle θ is set to the target steering angle θtar (clockwise) by way of automatic steering, the user's own vehicle 10 moves forward while turning to the right. A detection of "near" by the front sonar devices 91 to 94 acts as a trigger, and in accordance with guidance provided by the navigation device 16, the driver performs an operation to depress the brake pedal.

In "OPERATION 3", the assist ECU 18 supplies an output signal to the navigation device 16 in order to carry out a rearward operation (a departure command and a stop command) of the user's own vehicle 10. In accordance with guidance provided by the navigation device 16, the driver operates the shift lever 32 to change the shift position from "D" to "R" and thereafter releases the brake pedal. In this instance, since the steering angle θ is set to the target steering angle θtar (counterclockwise) by way of automatic steering, the user's own vehicle 10 moves rearward while turning to the left. A detection of "near" by the rear sonar devices 95 to 98 acts as a trigger, and in accordance with guidance provided by the navigation device 16, the driver performs an operation to depress the brake pedal.

In "OPERATION 4", the assist ECU 18 supplies an output signal to the navigation device 16 in order to carry out a forward operation (a departure command and a stop command) of the user's own vehicle 10. In accordance with guidance provided by the navigation device 16, the driver operates the shift lever 32 to change the shift position from "R" to "D" and thereafter releases the brake pedal. In this instance, since the steering angle θ is set to the target steering angle θtar (clockwise) by way of automatic steering, the user's own vehicle 10 moves forward while turning to the right. A detection of "near" is not made by the front sonar devices 91 to 94, and the user's own vehicle 10 reaches an end of assistance position.

As will be described later, it should be noted that, in the case that a primary determination is satisfied in which the user's own vehicle 10 is in a state in which exiting from parking is possible in the "forward traveling mode" in FIG. 5, and a secondary determination is satisfied to the effect that continuation of the assist control in the "assist continuation determination mode" has ended, the assist ECU 18 (assist continuation determining unit 58) establishes the determination of completion of the parking exit assist control by confirming the determination to the effect that the user's own vehicle 10 is capable of exiting from parking, and terminates the parking exit assist control of the user's own vehicle 10 by the assist control unit 60.

In "OPERATION 5", the driver receives the notification (termination of parking exit assist) issued by the navigation device 16, and grasps that the responsibility for driving has been handed over to the driver himself. The driver departs from the parallel parking space 100 by pressing the accelerator pedal. Consequently, the parking space exiting operation of the user's own vehicle 10 is completed.

<State Transition Diagram>

Figure 5:
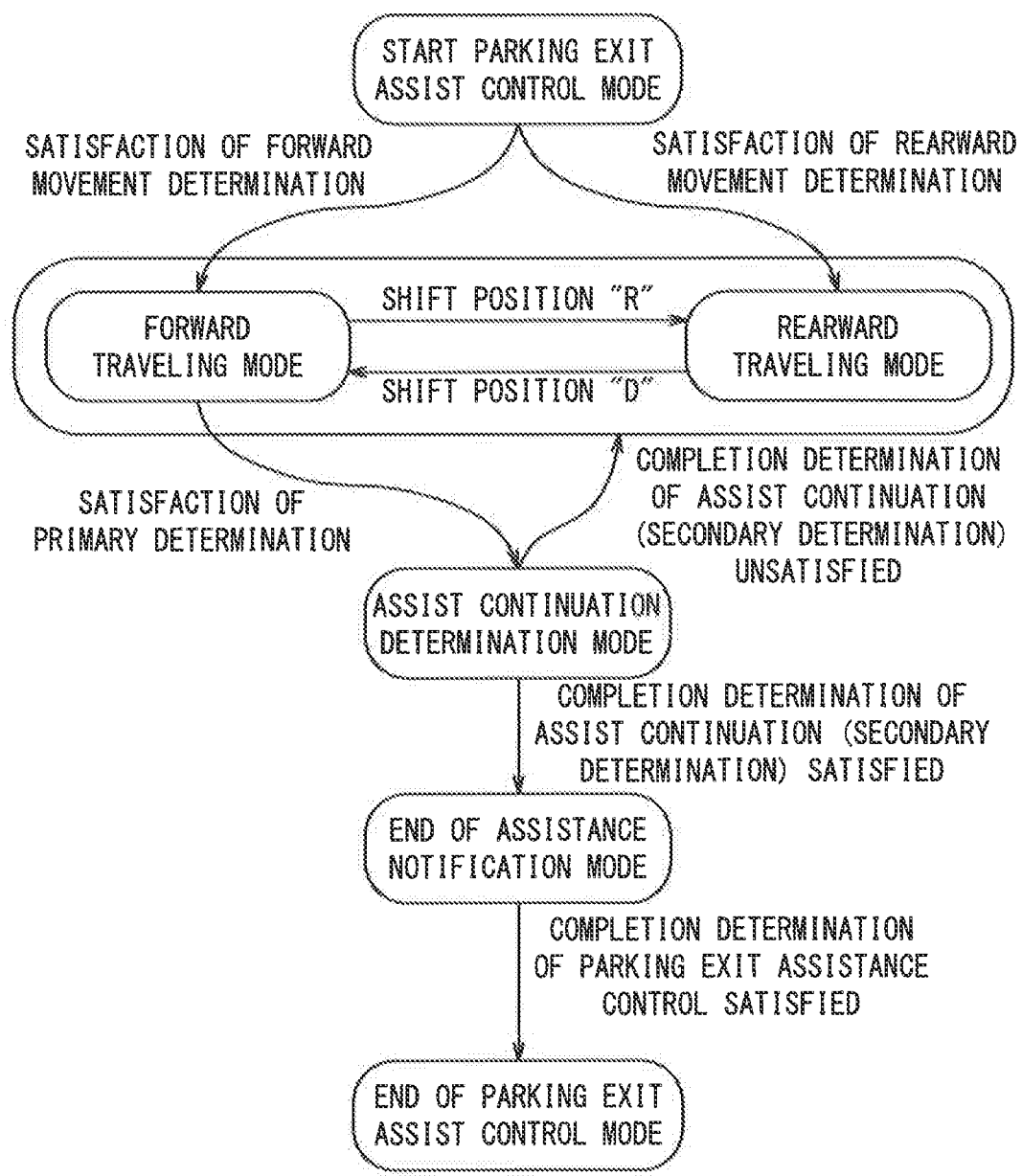
FIG. 5 is a state transition diagram of a parking exit assist control mode.

FIG. 5 is a state transition diagram of the parking exit assist control mode. The parking exit assist control mode is made up from four modes, including [1] a forward traveling mode, [2] a rearward traveling mode, [3] an assist continuation determination mode, and [4] an end of assistance notification mode.

Initially, accompanying the occurrence of the event of the "parking exit assist control mode", a transition is made to either one of the "forward traveling mode" or the "rearward traveling mode". For example, in the case that "near" is detected by one or more of the rear sonar devices 95 to 98, a forward traveling determination is satisfied, and the process transitions to the "forward traveling mode". On the other hand, in the case that the forward traveling determination is not satisfied, then the rearward traveling determination is satisfied, and the process transitions to the "rearward traveling mode".

For example, after having transitioned to the "rearward traveling mode", the "rearward traveling mode" is maintained until the shift position is changed from "R" to "D". On the other hand, in the case that the shift position is changed from "R" to "D" during execution of the "rearward traveling mode", a transition is made from the "rearward traveling mode" to the "forward traveling mode".

For example, after having transitioned to the "forward traveling mode", the "forward traveling mode" is maintained until either the shift position is changed from "D" to "R", or until a later-described "exiting from parking is possible" state is detected (the primary determination is satisfied). In the case that the shift position is changed to "R" during execution of the "forward traveling mode", a transition is made from the "forward traveling mode" to the "rearward traveling mode".

Figure 6:
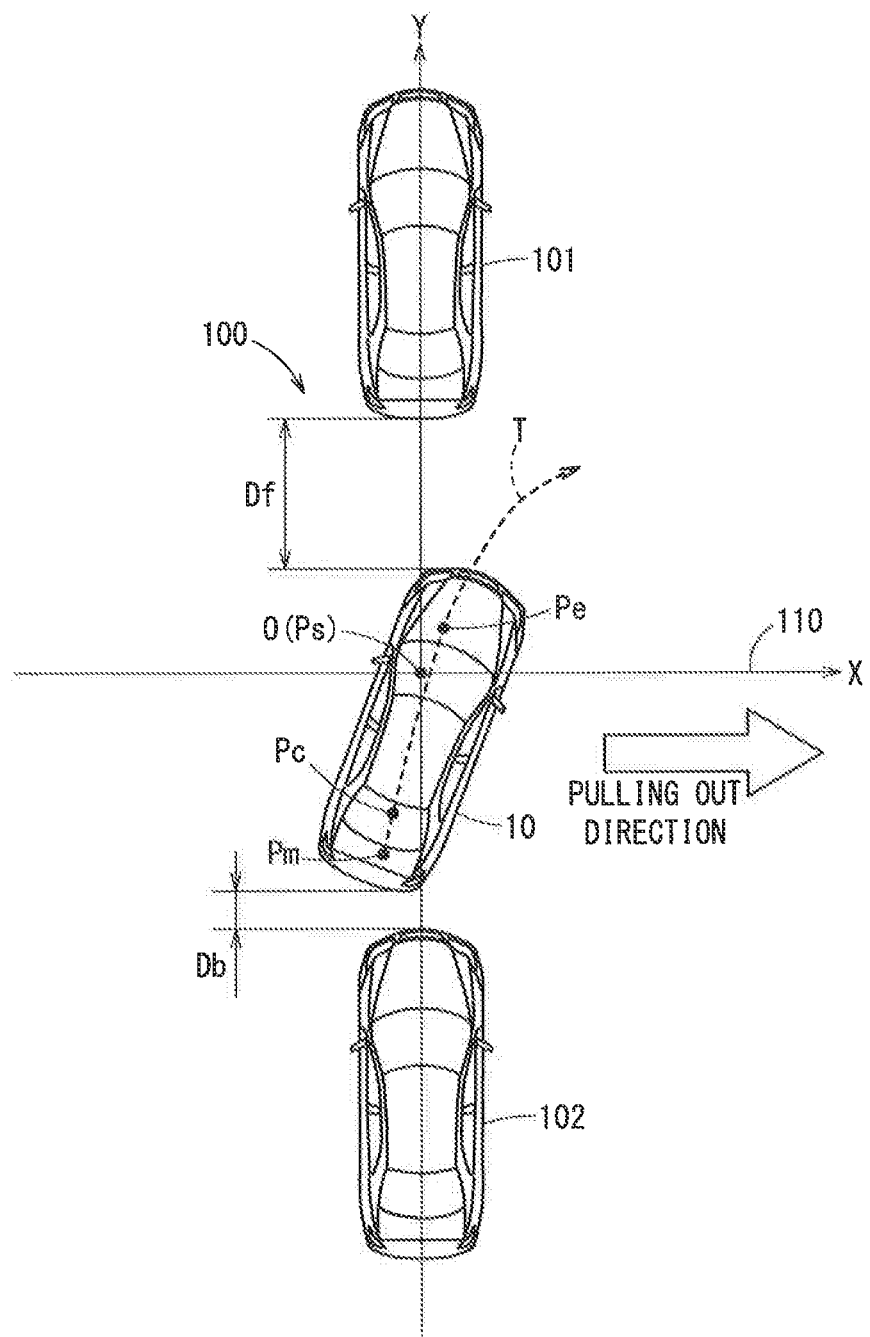
FIG. 6 is a schematic diagram showing a method of setting an exit-from-parking trajectory.

In this instance, the primary determination condition for detecting the state in which "exiting from parking is possible" is, for example, a condition in which "near" is not detected in all four of the front sonar devices 91 to 94 (see FIG. 8), and where the user's own vehicle 10 has arrived at the end of assistance position Pe on an exit-from-parking trajectory T (see FIG. 6). More specifically, this is a case in which the detection results of the front center sonar devices 92, 93 are "undetected", and the detection results of the front corner sonar devices 91, 94 are not "near" ("far" or "undetected"). Moreover, in FIG. 8, a case is shown in which the front sonar devices 91 to 94 could not detect (the right rear position P of) the other front vehicle 101, and a detection result of "near" did not come about.

In the case that the primary determination of the "forward traveling mode" is satisfied, a transition is made from the "forward traveling mode" to the "assist continuation determination mode". After having made the transition, the "assist continuation determination mode" is maintained until a later-described completion determination of continuation of assistance (the secondary determination) is satisfied.

In the case that the completion determination of the "assist continuation determination mode" is satisfied, a transition is made from the "assist continuation determination mode" to the "end of assistance notification mode". After having made the transition, the "end of assistance notification mode" is maintained until a completion determination of the parking exit assist control is satisfied. On the other hand, if a completion determination of the "end of assistance notification mode" is satisfied, the event of the "parking exit assist control mode" is terminated.

It should be noted that, in the "parking exit assist control mode", although the control is basically started from the "rearward traveling mode", if an obstacle is located in close proximity behind the user's own vehicle 10, an exception is made, and the control is started from the "forward traveling mode".

<Operations During the Forward Traveling Mode>

Figure 7:
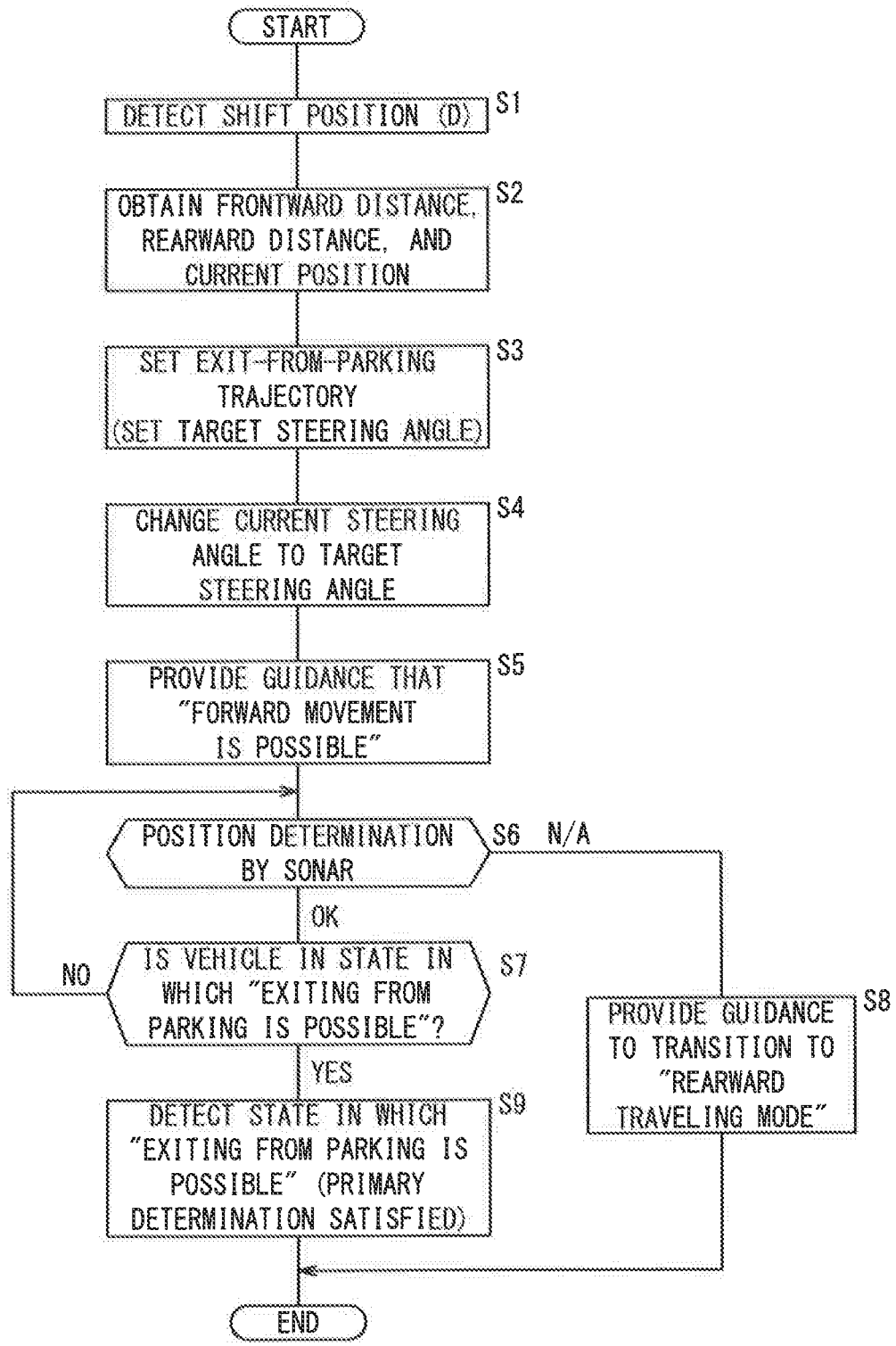
FIG. 7 is a flowchart for providing an explanation of operations of the parking exit assist device in a "forward traveling mode" shown in FIG. 5.

Next, a detailed description will be given concerning operations of the parking exit assist device 12 in the "forward traveling mode" of FIG. 5. FIG. 6 is a schematic diagram showing a method of setting the exit-from-parking trajectory T. FIG. 7 is a flowchart in which there is shown in detail an explanation of operations of the parking exit assist device 12 in the "forward traveling mode" of FIG. 5.

As shown in FIG. 6, a case is assumed in which the user's own vehicle 10 exits from the parallel parking space 100 while assuring certain distances between the other front vehicle 101 and the other rear vehicle 102. An exit-from-parking coordinate system 110 is defined by a state of the user's own vehicle 10 at a time when the parking exit assist control is started. More specifically, the X-axis is an axis lying parallel to the vehicle transverse direction of the user's own vehicle 10, and the Y-axis is an axis lying parallel to the vehicle longitudinal direction of the user's own vehicle 10. In addition, the position of the user's own vehicle 10 (hereinafter referred to as an assist starting position Ps (predetermined position)) is set as the origin O of the exit-from-parking coordinate system 110. Moreover, the pulling out direction of the user's own vehicle 10 is in the positive direction of the X-axis, and is a direction in which the user's own vehicle 10 intends to travel (pull out) with respect to the assist starting position Ps.

Below, the current position of the user's own vehicle 10 is referred to as a current position Pc. For example, at the current position Pc, the distance (hereinafter referred to as a frontward distance Df) between the user's own vehicle 10 and the other front vehicle 101 is detected by the front sonar device 91. Further, at the current position Pc, the distance (hereinafter referred to as a backward distance Db) between the user's own vehicle 10 and the other rear vehicle 102 is detected by the rear sonar device 98.

In this instance, every time that a turning back operation of the user's own vehicle 10 occurs, the parking exit assist device 12 (and more specifically, the assist ECU 18) identifies a stopped position of the user's own vehicle 10 (hereinafter referred to as an intermediate position Pm (predetermined position) at which turning back occurs), and calculates and sets the exit-from-parking trajectory T which passes through the intermediate position Pm. The exit-from-parking trajectory T is a (curved or straight line) trajectory through which the user's own vehicle 10 is capable of passing in a state in which the steering angle θ is set to the target steering angle θtar.

The intermediate position Pm corresponding to a starting point, and the end of assistance position Pe corresponding to an ending point are located on the exit from parking trajectory T. In this instance, the end of assistance position Pe is a position at which the user's own vehicle 10 is actually determined to be capable of exiting from parking in the later-described primary determination of the "forward traveling mode", or alternatively, a reference position for the purpose of determining whether or not the user's own vehicle 10 is capable of exiting from parking with the primary determination.

The flowchart of FIG. 7 shows principal operations from the start of the "forward traveling mode" to the end of the "forward traveling mode". After completion of the flowchart, in the case that a completion termination (secondary determination) of the parking exit assist control is satisfied in the "assist continuation determination mode", a transition is made to the "end of assistance notification mode", whereas, in the case that a determination result is obtained in which the secondary determination is not satisfied, a transition is made to the "rearward traveling mode".

In step S1, the assist ECU 18 determines from a detection signal of the shift position sensor 30 that the shift position of the shift lever 32 is "D" and initiates the "forward traveling mode". At this point in time, the user's own vehicle 10 is stopped at the intermediate position Pm shown in FIG. 6.

In step S2, the assist ECU 18 (exit-from-parking trajectory setting unit 56) acquires various information indicative of a positional relationship with obstacles in the vicinity of the user's own vehicle 10. More specifically, the front sonar devices 91 to 94 respectively detect the frontward distance Df between the user's own vehicle 10 and the other front vehicle 101 in front of the user's own vehicle 10. Further, the rear sonar devices 95 to 98 respectively detect the backward distance Db between the user's own vehicle 10 and the other rear vehicle 102 in back of the user's own vehicle 10.

In addition to the frontward distance Df and the backward distance Db, the assist ECU 18 determines the current position Pc, or in other words, the latest intermediate position Pm, in the exit-from-parking coordinate system 110, which was defined in advance. The current position Pc can be calculated, for example, by tracking the actual movement trajectory from the most recent intermediate position Pm (or the assist starting position Ps). The movement trajectory is calculated by using, respectively, the starting point and shape of the most recently set exit-from-parking trajectory T, and the travel distance of the user's own vehicle 10.

In step S3, the exit-from-parking trajectory setting unit 56 sets the exit-from-parking trajectory T for the user's own vehicle 10, using the frontward distance Df, the rearward distance Db, and the intermediate position Pm, which were obtained respectively in step S2. More specifically, the exit-from-parking trajectory setting unit 56 sets, respectively, a target steering angle θtar suitable for the current state of the vehicle or the surrounding situation, and an exit-from-parking trajectory T (shown by the dashed line) passing through the latest intermediate position Pm. Moreover, in the "forward traveling mode" at the time when the parking exit assist control is started, the total route of the exit-from-parking trajectory T may be created, or alternatively, each time that a transition is made to the "forward traveling mode", in step S3, at least a portion of the route of the exit-from-parking trajectory T may be created.

In step S4, the assist control unit 60 changes the current steering angle θ of the user's own vehicle 10 (the most recently set steering angle before a turning back operation at the intermediate position Pm) to the target steering angle θtar that was set in step S3. More specifically, the assist control unit 60 supplies a control signal to the EPS-ECU 76 in order to instruct that a change be made to the target steering angle θtar. Consequently, automatic steering is performed in a state in which the user's own vehicle 10 is stopped at the intermediate position Pm.

In step S5, the output control unit 62 supplies an output signal to the navigation device 16 indicating that the user's own vehicle 10 is capable of moving forward. When the driver performs an operation to release the brake pedal in accordance with guidance provided by the navigation device 16, the user's own vehicle 10 moves in the forward direction along the exiting-from-parking trajectory T under the action of a creep force.

Figure 8:
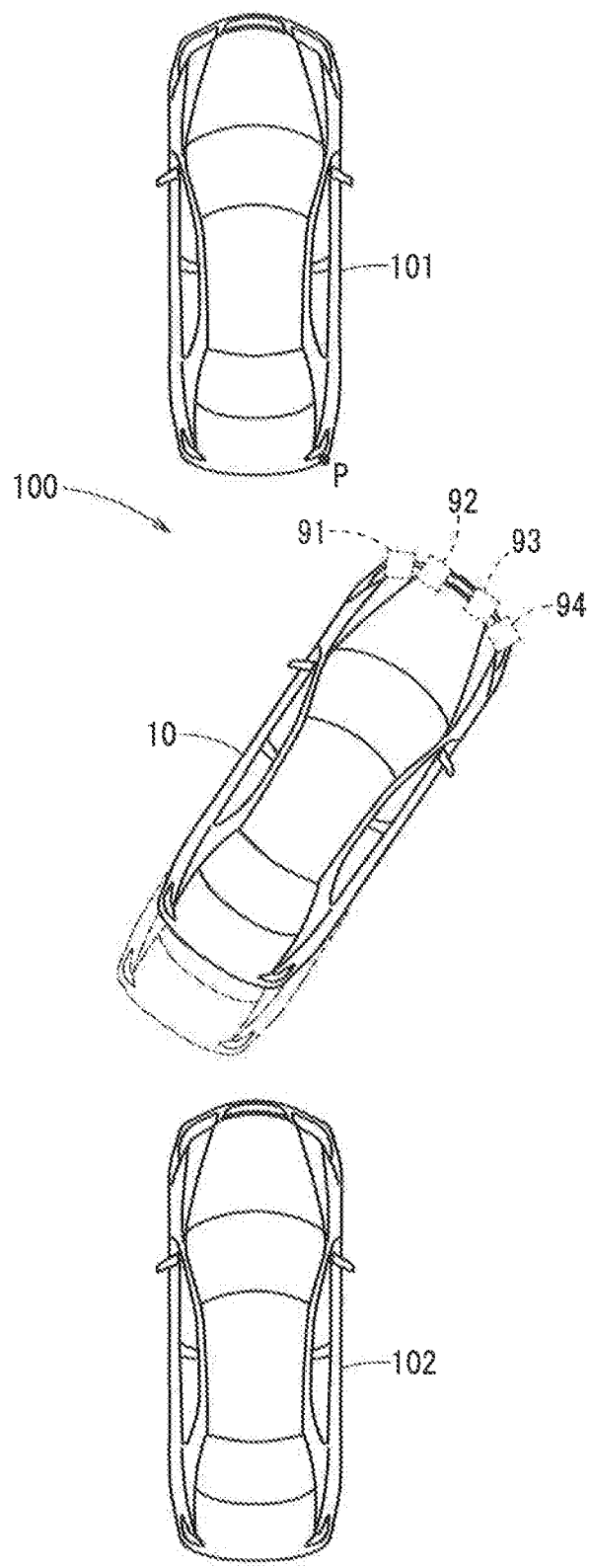
FIG. 8 is a schematic diagram showing a case of detecting a state in which it is possible to exit from parking.

In step S6, the assist continuation determining unit 58 performs a position determination by the front sonar devices 91 to 94. More specifically, as shown in FIG. 8, whether or not "near" is detected is determined by at least one of the front sonar devices 91 to 94 detecting the right rear position P of the other front vehicle 101 or another obstacle. If it is determined that such a detection is not made (step S6: OK), the process proceeds to the next step (step S7).

In step S7, the assist continuation determining unit 58 determines whether or not the user's own vehicle 10 is in a state in which "exiting from parking is possible", and more specifically, determines whether or not the user's own vehicle 10 has arrived at the end of assistance position Pe on the exit-from-parking trajectory T, and is in a state in which the other front vehicle 101 or another obstacle does not exist on the exit-from-parking trajectory T, by the front sonar devices 91 to 94 not being capable of detecting the other front vehicle 101 or any other obstacle. If the end of assistance position Pe has not yet been reached (step S7: NO), the process returns to step S6, and the determinations of step S6 and step S7 are repeatedly executed.

Incidentally, in the case it is determined in step S6 that "near" has been detected by at least one of the front sonar devices 91 to 94 (step S6: N/A), then the process proceeds to step S8.

In step S8, the assist continuation determining unit 58 determines that the user's own vehicle 10 cannot exit from parking in its present state while maintaining the exit-from-parking trajectory T, and the assist ECU 18 receives the determination result from the assist continuation determining unit 58, terminates the "forward traveling mode", and transitions to the "rearward traveling mode". More specifically, the assist control unit 60 outputs a control signal to the navigation device 16 to provide guidance to the driver so as to operate the shift lever 32 and change the shift position to "R", and based on the control signal, the touch panel display 40 displays guidance information of the operation to "R". Consequently, the shift position becomes "R" due to the operation of the shift lever 32 by the driver, and when the shift position sensor 30 detects the "R" shift position, the assist control unit 60 terminates the "forward traveling mode" and transitions to the "rearward traveling mode".

On the other hand, if the determination result of step S7 is affirmative (step S7: YES), then the process proceeds to step S9.

In step S9, the assist continuation determining unit 58 provisionally determines that a state ("exiting from parking is possible" state) has been brought about, which is a state in which the other front vehicle 101 or any other obstacle does not exist on the exit-from-parking trajectory T, and in which exiting from parking is possible without the forward-traveling user's own vehicle 10 performing a turning back operation. In addition, the assist ECU 18 terminates the "forward traveling mode" upon receiving the result of the primary determination, which indicates that a state was detected by the assist continuation determining unit 58 in which exiting from parking is possible.

In the foregoing manner, the "forward traveling mode" is terminated. In this case, due to the implementation of guidance made with respect to the driver to change to the "rearward traveling mode" (step S8), the assist ECU 18 transitions from the "forward traveling mode" to the "rearward traveling mode". On the other hand, in the case that the primary determination is made that the vehicle is in the "exiting from parking is possible" state (step S9), the assist ECU 18 transitions from the "forward traveling mode" to the "assist continuation determination mode".

The "rearward traveling mode" shown in FIG. 5 also is executed basically according to the same procedures shown in the flowchart of FIG. 7. However, the differences in the "rearward traveling mode" are that [1] the shift position is "R" (step S1), [2] the end of assistance position Pe is not set (steps S3 and S7), [3] the travel direction of the user's own vehicle 10 is opposite (step S5), and [4] detection results of the rear sonar devices 95 to 98 are used (step S6).

Further, in the operations of FIG. 7, primarily, a case has been described in which the user's own vehicle 10 arrives at the end of assistance position Pe from the most recent intermediate position Pm (after a turning back operation) along the exit-from-parking trajectory T, and then the primary determination of the "exiting from parking is possible" state is carried out. It is a matter of course that the operations of FIG. 7 can also be applied to a case in which, because there is no other front vehicle 101 or any other obstacle on the exit-from-parking trajectory T, immediately after the start of the parking exit control, the user's own vehicle 10 arrives at the end of assistance position Pe along the exit-from-parking trajectory T from the assist starting position Ps, and the primary determination of the "exiting from parking is possible state" is carried out.

<Operations of Assist Continuation Determination Mode>

Next, a detailed description will be made concerning operations of the "assist continuation determination mode" shown in FIG. 5.

As noted above, in steps S7 and S9 of FIG. 7, in the "forward traveling mode", the assist continuation determining unit 58 determines whether the user's own vehicle 10 has traveled forward on the exit-from-parking trajectory T by a certain distance (to the end of a assistance position Pe) from the intermediate position Pm or the assist starting position Ps, and if the front sonar devices 91 to 94 do not detect "near", the primary determination is made that the user's own vehicle 10 is in the "exiting from parking is possible" state.

However, if the responsibility for driving is immediately handed over from the parking exit assist device 12 to the driver at the point in time when the primary determination that the vehicle is in the "exiting from parking is possible" state is satisfied, there is a possibility that the driver will perceive the change in the shift position of the shift lever 32 to "D" as being forcibly operated by the parking exit assist device 12 regardless of his own will.

Figure 9:
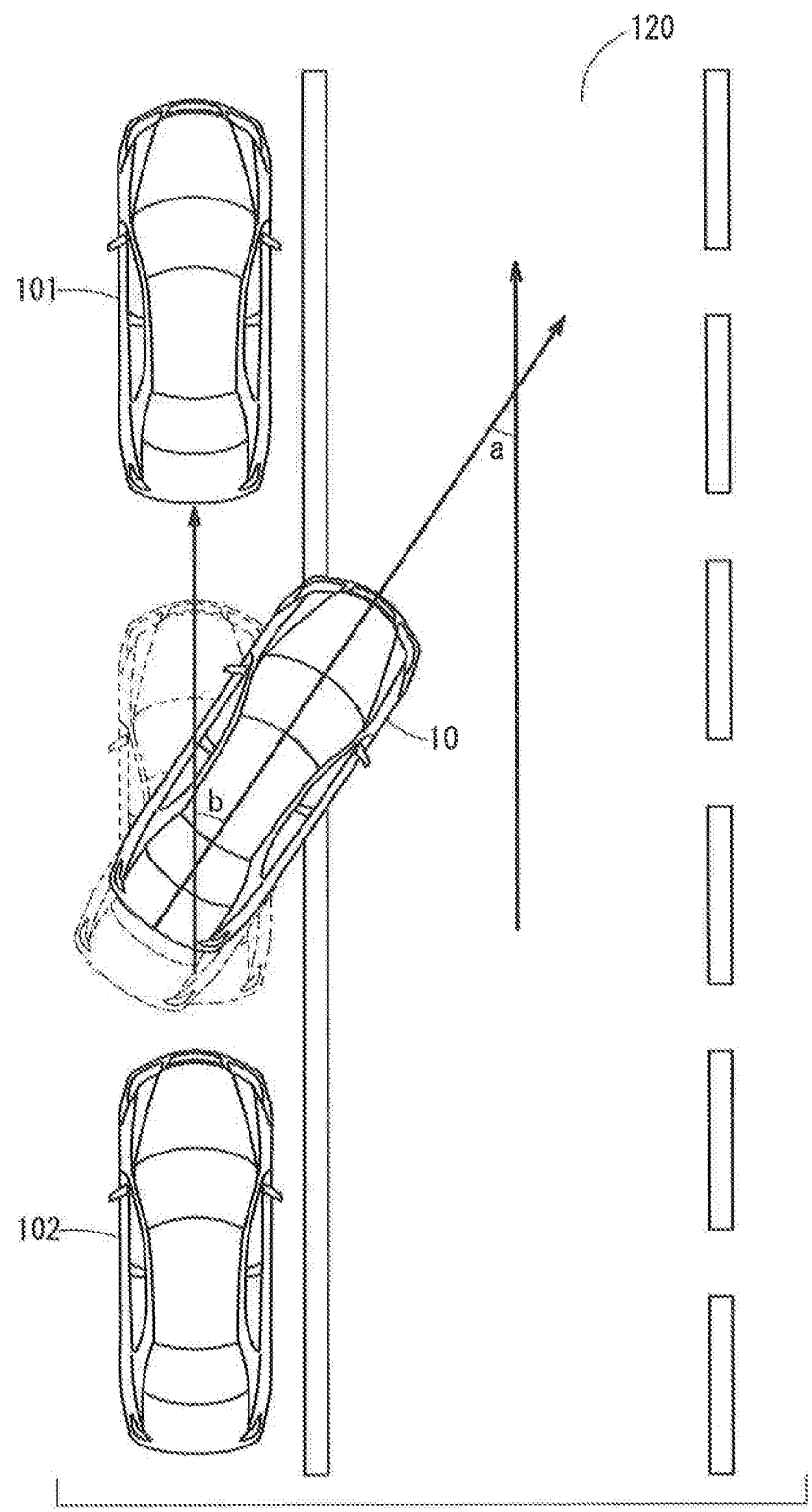
FIG. 9 is a schematic diagram showing a yaw angle of a user's own vehicle at a time of exiting from parking.

Further, as shown in FIG. 9, in the case that the user's own vehicle 10 exits from parking and merges with a lane 120 in a state of being inclined at a yaw angle b with respect to the angle (yaw angle: 0 degrees) in a yaw direction (a direction of rotation of the user's own vehicle 10 as viewed in plan) of the user's own vehicle 10 at the assist starting position Ps (see FIG. 6) as shown by the broken line, when the yaw angle b is large, it becomes more difficult for the user's own vehicle 10 to merge with the lane 120. The yaw angle b is an angular difference between the orientation of the user's own vehicle 10 at the assist starting position Ps and the orientation of the user's own vehicle 10 at the time of pulling out from the parking space.

Such a concern is also brought about in the case that the orientation of the user's own vehicle 10 at the current position Pc with respect to the direction of the lane 120 (the yaw angle a as an angular difference with respect to the lane 120) becomes large.

Thus, even in the case that the primary determination is satisfied in which the "exiting from parking is possible" state is detected in step S9 of FIG. 7, the parking exit assist device 12 (assist continuation determining unit 58) does not transition immediately to the "end of assistance notification mode" of FIG. 5, but rather, in the "assist continuation determination mode", the parking exit assist control is continued until the user's own vehicle 10 has traveled forward by a certain distance, and a secondary determination is made to terminate the parking exit assist control when the user's own vehicle 10 has traveled forward from the most recent intermediate position Pm or the assist starting position Ps (the predetermined position) up to a minimum forward distance Da (predetermined distance).

The "assist continuation determination mode" will now be described in detail with reference to FIG. 10.

In step S10, the computation unit 52 (assist continuation determining unit 58) calculates the yaw angle b. The yaw angle b of the user's own vehicle 10 can be calculated, for example, by installing the yaw rate sensor 122 (FIG. 1) in the vicinity of a center of gravity position of the user's own vehicle 10, and integrating an output (yaw rate: angular velocity) of the yaw rate sensor 122. Instead of the yaw rate sensor 122, a geomagnetic sensor or various types of gyroscopic sensors may be used.

In step S11, the assist continuation determining unit 58 sets a predetermined distance (minimum forward distance Da) on the exit-from-parking trajectory T from the most recent intermediate position Pm or the assist starting position Ps up to a point at which the assist control is terminated. The minimum forward distance Da is defined, on the exit-from-parking trajectory T, as a distance from the most recent intermediate position Pm or the assist starting position Ps up to the end of assistance position Pe, or alternatively, as a distance from the most recent intermediate position Pm or the assist starting position Ps up to a point in front of (more forward than) the end of assistance position Pe. Moreover, in the case that the assist control is terminated at a point in front of the end of assistance position Pe, the point where the "exiting from parking is possible" state is detected (e.g., the end of assistance position Pe) may be taken as a calculation starting point, and a distance therefrom up to a point a predetermined distance ahead can be defined as the minimum forward distance Da.

Figure 11:
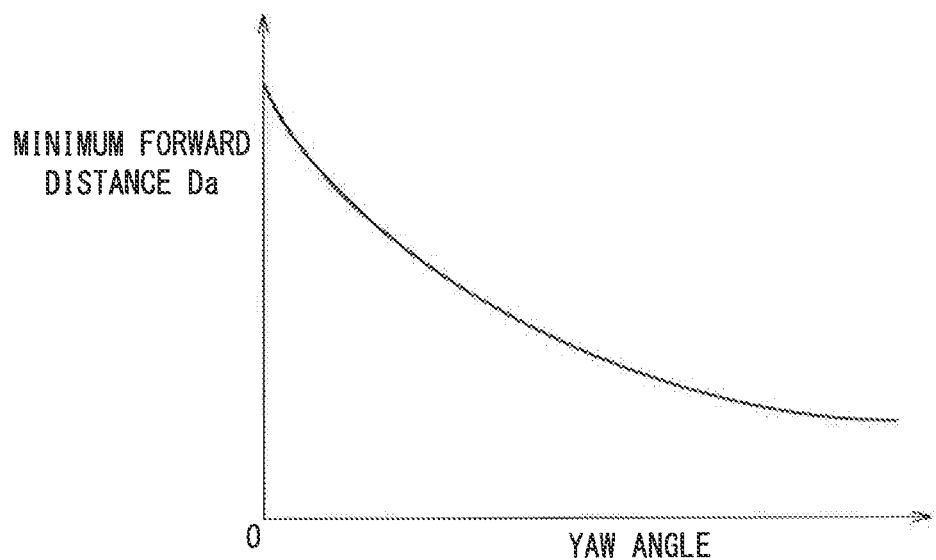
FIG. 11 is a diagram showing a relationship between a minimum forward distance and a yaw angle.

Thus, the assist continuation determining unit 58 sets the minimum forward distance Da on the basis of the assist starting position Ps, the position of the lane 120 into which the user's own vehicle 10 exits from parking and merges with, and the position (the most recent intermediate position Pm, the assist starting position Ps, or the current position Pc) of the user's own vehicle 10. Further, as shown in FIG. 11, the assist continuation determining unit 58 may set the minimum forward distance Da to be shorter as the yaw angle b, which is the angular difference between the orientation of the user's own vehicle 10 at the assist starting position Ps (yaw angle: 0 degrees) and the orientation of the user's own vehicle 10 at the position (for example, the current position Pc) of the user's own vehicle 10, becomes greater, or as the yaw angle a, which is the angular difference of the user's own vehicle 10 at the current position of the user's own vehicle 10 with respect to the lane 120, becomes greater. More specifically, as the yaw angles a, b become greater, it becomes more difficult for the user's own vehicle 10 to merge with the lane 120, and therefore, by setting the minimum forward distance Da to be shorter as the yaw angles a, b become larger, it is made easier for the user's own vehicle 10 to merge with the lane 120.

Moreover, in the case that the most recent intermediate position Pm or the assist starting position Ps is used as the position of the user's own vehicle 10, the assist continuation determining unit 58 carries out setting of the minimum forward distance Da, for example, with step S11 being performed as a one-time process. Alternatively, in the case that the most recent intermediate position Pm or the current position Pc of the user's own vehicle 10 is used as the position of the user's own vehicle 10, then, for example, each time that the "assist continuation determination mode" is executed, by setting the minimum forward distance Da in step S11, the assist continuation determining unit 58 changes the minimum forward distance Da of the previous time.

In step S12, the assist continuation determining unit 58 determines whether the user's own vehicle 10 has traveled forward up to the minimum forward distance Da from the most recent intermediate position Pm or the assist starting position Ps.

If the user's own vehicle 10 has traveled forward up to the minimum forward distance Da (step S12: YES), the process proceeds to step S13. In step S13, the assist continuation determining unit 58 determines again whether the front sonar devices 91 to 94 are incapable of detecting the other front vehicle 101 or any other obstacle (they are in the detection incapable region).

If it is determined that the front sonar devices 91 to 94 are in the detection incapable region (step S13: YES), the process proceeds to step S14. In step S14, since it is possible for the user's own vehicle 10 to pull out from the parking space, the assist continuation determining unit 58 carries out a determination to the effect that the parking exit assist control is terminated. More specifically, in step S7 and step S9, the assist continuation determining unit 58 provisionally determines (makes the primary determination) that the user's own vehicle 10 is in the "exiting from parking is possible" state, and in steps S12 through S14, carries out the secondary determination to confirm or finally determine that "exiting from parking is possible".

As a result, in step S14, a completion determination (secondary determination) to terminate continuation of the parking exit assist in the "assist continuation determination mode" is satisfied, and it is possible to transition to the "end of assistance notification mode". Stated otherwise, after having detected the "exiting from parking is possible" state in step S9 of FIG. 7, the assist continuation determining unit 58 causes the user's own vehicle 10 to travel forward by a certain distance, and when the user's own vehicle 10 has traveled from the most recent intermediate position Pm or the assist starting position Ps up to the minimum forward distance Da, the assist continuation determining unit 58 performs the determination to terminate the parking exit assist control. Consequently, the assist control unit 60 receives the determination result of the assist continuation determining unit 58, and terminates the parking exit assist control with respect to the user's own vehicle 10.

On the other hand, if the determination results in step S12 and step S13 are negative (steps S12, S13: NO), then the process proceeds to step S15. In step S15, the assist continuation determining unit 58 carries out a determination to the effect that the parking exit assist control is continued. As a result, the completion determination of the "assist continuation determination mode" is not satisfied, and the process returns to the "forward traveling mode" or the "rearward traveling mode". More specifically, the assist control unit 60 receives the determination result of the assist continuation determining unit 58, and continues the parking exit assist control with respect to the user's own vehicle 10.

In the foregoing manner, when the completion determination of continuation of the parking exit assist in the "assist continuation determination mode" is satisfied, a steering angle neutralization control is carried out by the assist control unit 60. In this instance, the "steering angle neutralization control" implies a steering angle control in which the steering angle $\theta$ that is set to the target steering angle $\theta$tar is changed so as to be brought into proximity to the neutral angle $\theta$o.

Figure 12:
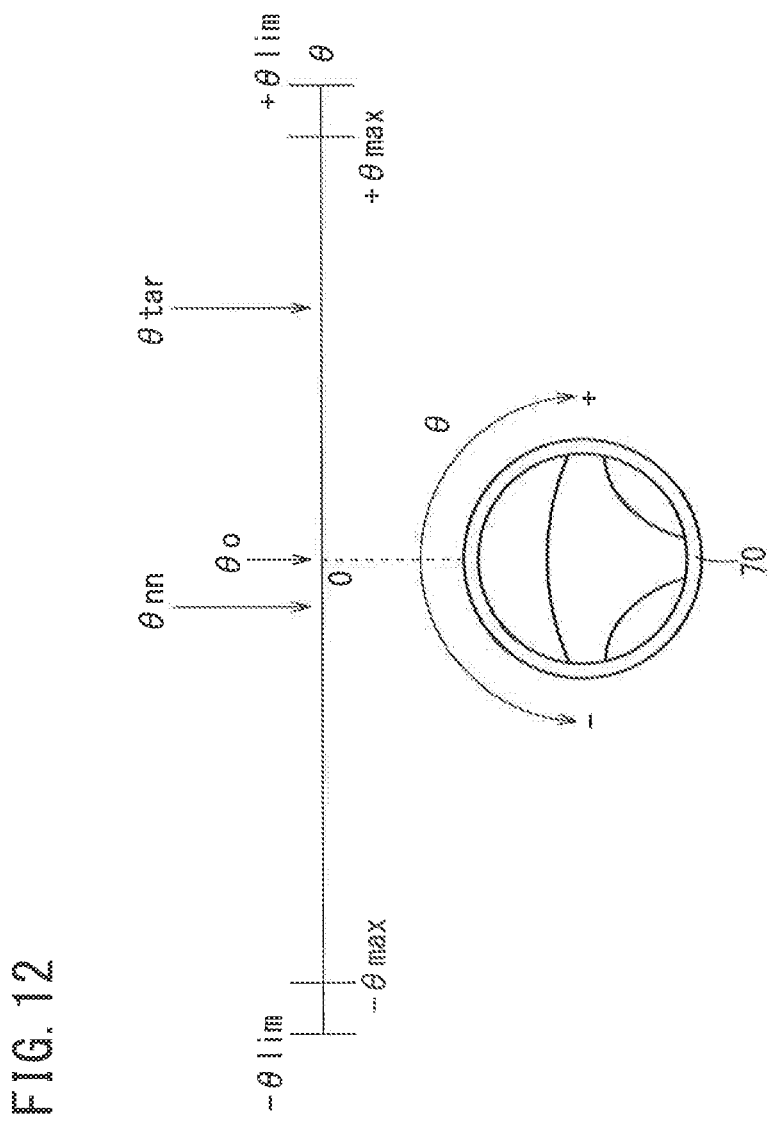
FIG. 12 is a schematic diagram for explaining parameters related to a steering angle of the steering wheel shown in FIG. 1.

FIG. 12 is a schematic diagram for explaining parameters related to the steering angle of the steering wheel 70 shown in FIG. 1. For the sake of convenience and to facilitate description thereof, in the present figure (FIG. 12), a movable range of the steering angle $\theta$ of the steering wheel 70 is shown in the form of a linear graph. The steering angle $\theta$ is defined such that the clockwise direction is regarded as a positive direction, and the counterclockwise direction is regarded as a negative direction, taking the neutral angle $\theta$o (=0 degrees) as a reference. Hereinafter, an angle in the vicinity (roughly −60 degrees to +60 degrees) of the neutral angle $\theta$o is referred to as a "neutral neighboring angle $\theta$nn".

In this instance, a limit angle $\theta$lim is a maximum steering angle (in the positive direction and the negative direction) by which the steering wheel 70 can be steered owing to the configuration of the steering mechanism. The target steering angle $\theta$tar is a steering angle that can be arbitrarily set within a range in which a controlled maximum angle $\theta$max serves as an upper limit (i.e., $0 \le |\theta| \le \theta tar$). Moreover, the controlled maximum angle θmax is set to a value that is slightly smaller than the limit angle θlim (for example, equivalent to 95% of the limit angle θlim). Setting of the controlled maximum angle θmax in this manner is for the purpose of suppressing operating noises of the steering mechanism, which are likely to occur by setting of the limit angle θlim, and in order to leave a margin with respect to overshooting of steering.

When a positive threshold (for example, 10 degrees), which is set depending on the type of the user's own vehicle 10, is set as the threshold value Th1, a magnitude relationship of Th1<|θnn| is satisfied. In the case that a difference between the target steering angle θtar and the neutral angle θo exceeds the threshold value Th1 (more specifically, if the inequality |θtar|>Th1 is satisfied), the steering angle θ of the user's own vehicle 10 is changed from the target steering angle θtar to the neutral neighboring angle θnn.

In particular, in the case that the steering angle θ of the user's own vehicle 10 is an angle which is inclined on one side (for example, θ>0 [degrees]) with respect to the neutral angle θo, the assist control unit 60 may perform an assist control to change the steering angle θ of the user's own vehicle 10 to the neutral neighboring angle (θnn<0 [degrees]) which is inclined on the other side with respect to the neutral angle θo. Assuming there is a return of the steering angle due to elastic deformation of the tires or backlash of the steering mechanism, it is possible for the steering angle θ after returning to one side to be brought closer in proximity to the neutral angle θo.

<Operations of the End of Assistance Notification Mode>

In this manner, when the parking exit assist control by the assist control unit 60 is terminated, and the steering angle neutralization control is also terminated due to the completion determination of continuation of the parking exit assist, then using the touch panel display 40 and/or the speaker 42, the assist continuation determining unit 58 may notify the driver of the user's own vehicle 10 that the user's own vehicle 10 is capable of exiting from parking. Consequently, the driver can grasp in a timely manner that the responsibility for driving has been handed over to the driver.

[Advantages and Effects of the Parking Exit Assist Device 12]

As has been described above, the parking exit assist device 12 comprises [1] the front sonar devices 91 to 94 which detect at least the frontward distance Df from the user's own vehicle 10 to the other front vehicle 101 in front of the user's own vehicle 10, [2] the exit-from-parking trajectory setting unit 56 which sets the target steering angle θtar of the user's own vehicle 10 on the basis of the frontward distance Df and the position of the user's own vehicle 10, and [3] the assist control unit 60 which carries out the assist control in which the steering angle θ of the user's own vehicle 10 is changed to the target steering angle θtar. In addition, in the case that it is possible for the user's own vehicle 10 to exit from parking, [4] the assist control unit 60 terminates the parking exit assist control with respect to the user's own vehicle 10 when the user's own vehicle 10 has traveled forward by a predetermined distance (the minimum forward distance Da) from a predetermined position (the more recent intermediate position Pm or the assist starting position Ps).

In this manner, in the event that the user's own vehicle 10 is capable of exiting from parking, the parking exit assist control is terminated when the user's own vehicle 10 has traveled forward from the predetermined position by the predetermined distance. Consequently, since the assist control is necessarily terminated after having traveled forward from the predetermined position, an immediate termination of the assist control triggered by an operation of the shift position can be avoided. As a result, it is possible to improve the affinity between the driver and the parking exit assist device 12 while also reducing the driver's feeling of annoyance, and further, after completion of the parking exit assist control, it is possible to smoothly hand over the responsibility for driving to the driver from the parking exit assist device 12.

Further, when the user's own vehicle 10 has traveled forward from the predetermined position by the predetermined distance, the assist control unit 60 may terminate the parking exit assist control if the front sonar devices 91 to 94 are in the detection incapable region. In accordance with this feature, it is possible to terminate the parking exit assist control in addition to confirming a condition of safety in front of the user's own vehicle 10 when exiting from parking.

In this case, the various advantageous effects described above are easily obtained by the parking exit assist device 12 being further equipped with the assist continuation determining unit 58 which determines to terminate the parking exit assist control in the event it was determined to continue the parking exit assist control by the assist control unit 60, and the user's own vehicle 10 has traveled forward from the predetermined position by the predetermined distance.

Figure 10:
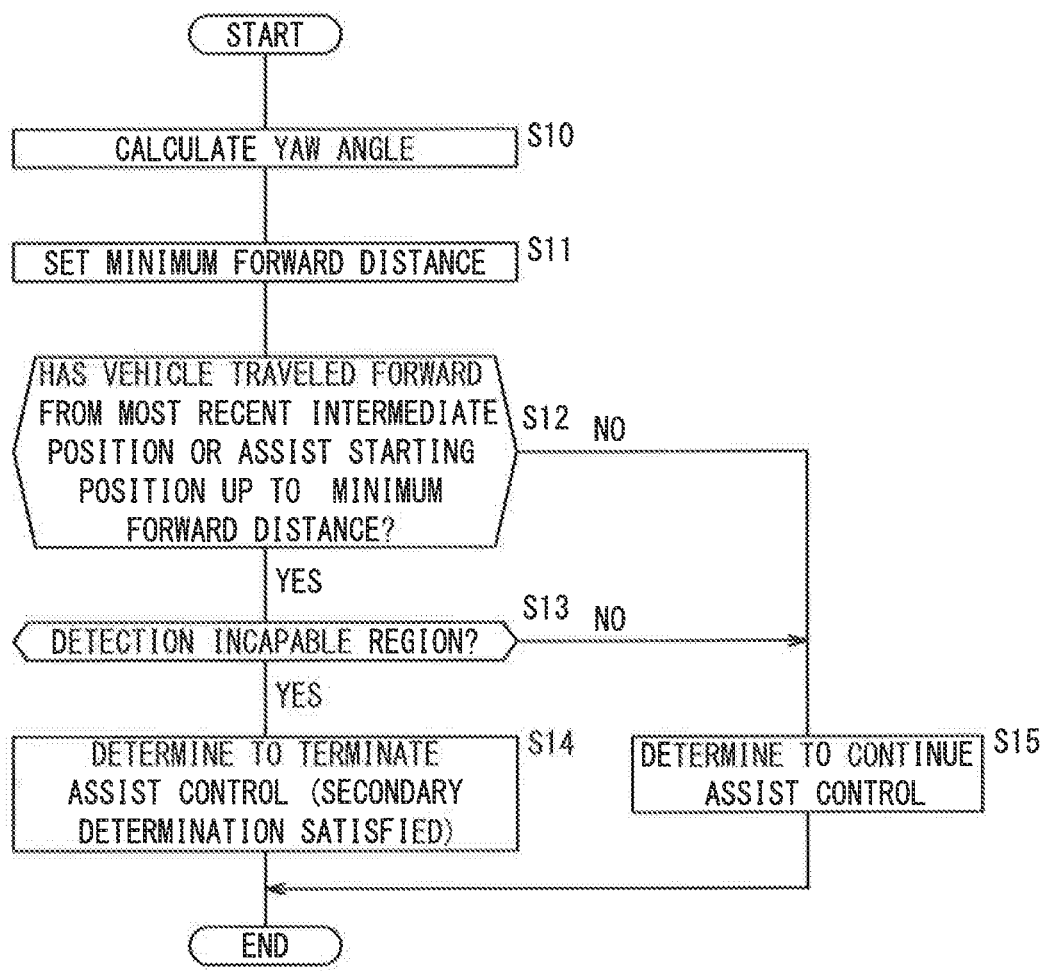
FIG. 10 is a flowchart for providing an explanation of operations of the parking exit assist device in an "assist continuation determination mode" shown in FIG. 5.

In the above description, although a case has been described in which a determination is made with the effect of terminating the assist control when the front sonar devices 91 to 94 are in the detection incapable region, in step S13 of FIG. 10, alternatively, it is also possible to determine to terminate the assist control in the case that the forward distance Dis is "Far" (if the forward distance Dis exceeds the threshold value D1).

Further, the assist continuation determining unit 58 may set the minimum forward distance Da on the basis of the assist starting position Ps, the position of the lane 120 into which the user's own vehicle 10 exits from parking and merges with, and the position of the user's own vehicle 10. In accordance with this feature, the assist control is terminated after having brought about an optimum condition for exiting from parking, and at this time, the responsibility for driving can be handed over to the driver.

Further, the assist continuation determining unit 58 sets the minimum forward distance Da to be shorter as the yaw angle b, which is the angular difference between the orientation of the user's own vehicle 10 at the assist starting position Ps and the orientation of the user's own vehicle 10 at the current position of the user's own vehicle 10, becomes greater, or as the yaw angle a, which is the angular difference of the user's own vehicle 10 at the current position of the user's own vehicle 10 with respect to the lane 120, becomes greater. When the angular difference increases, it becomes more difficult for the user's own vehicle 10 to merge with the lane 120, and therefore, by setting the minimum forward distance Da to be shorter as the angular difference becomes larger, it is made easier for the user's own vehicle 10 to merge with the lane 120.

[Supplemental Considerations]

The present invention is not limited to the embodiment described above, and it goes without saying that modifications can freely be made thereto within a scope that does not depart from the essence and gist of the present invention.

According to the present embodiment, although automatic steering was described as an example, it is possible for various driving modes to be adopted in which an accelerator pedal (not shown), a brake pedal (not shown), and automatic operations or manual operations of the shift lever 32 are combined.

According to the present embodiment, an exemplary case has been presented and described in which the steering angle of the steering wheel 70 is changed. However, instead of the steering angle θ, another physical quantity or a controlled quantity related to the steering of the user's own vehicle 10 may be used. For example, the steering angle θ may be a turning angle or a toe angle of the vehicle wheels, or may be a steering angle command value defined within the EPS-ECU 76.

According to the present embodiment, a configuration is adopted in which automatic steering of the steering wheel 70 is carried out. However, the means by which the steering angle θ is changed is not limited to this feature. For example, by the EPS-ECU 76 outputting a steer-by-wire command signal to a wheel turning mechanism, the steering angle θ in the form of a turning angle of the vehicle wheels may be changed. Alternatively, the steering angle θ in the form of a turning angle of the vehicle wheels may be changed by effecting a speed difference between the speed of rotation of an inner wheel and the speed of rotation of an outer wheel.

According to the present embodiment, steering of the steering wheel 70, the operation of changing the shift position, and operation of the brake pedal may be performed automatically during the parking exit assist control by the assist control unit 60. In this case, after the parking exit assist control is terminated, a transition may be made in which all of such operations, or a portion of such operations, are performed by way of manual operations by the driver. Further, concerning the operations that are carried out automatically during the parking exit assist control, after the parking exit assist control is terminated, aside from transferring such operations over to the driver, the operations of the driver may be assisted.

According to the present embodiment, although the sonar devices 91 to 98 are used as a means for detecting the frontward distance Df or the backward distance Db, the invention is not limited to this feature. The front detection means (or the rear detection means), for example, may be a distance measuring radar, or may be a stereo camera.

What is claimed is:

1. A parking exit assist device comprising:
    a front detection unit configured to detect at least a frontward distance from a user's own vehicle to a front obstacle in front of the user's own vehicle;
    a target steering angle setting unit configured to set a target steering angle of the user's own vehicle and an exit-from-parking trajectory from a predetermined position, on a basis of the frontward distance detected by the front detection unit and a position of the user's own vehicle;
    an assist control unit configured to carry out an assist control in which a steering angle of the user's own vehicle is changed to the target steering angle set by the target steering angle setting unit; and
    an assist continuation determination unit configured to determine that the user's own vehicle is capable of exiting from parking, in a case where the user's own vehicle has traveled forward on the exit-from-parking trajectory by a certain distance from the predetermined position and no front obstacle is being detected by the front detection unit,
    wherein the assist control unit is configured to determine a state for terminating the assist control in an event that the user's own vehicle has traveled forward from the predetermined position by a predetermined distance equal to or greater than the certain distance at a time that the assist continuation determination unit determines that the user's own vehicle is capable of exiting from parking, and to terminate the assist control when the state for terminating the assist control is determined,
    wherein the predetermined position is an assist starting position, which is one of a position of the user's own vehicle at a time that the assist control is started and a most recent turning back position in a case that the user's own vehicle performs a turning back operation,
    wherein the assist continuation determining unit is configured to set the predetermined distance on a basis of the assist starting position, a position of the lane into which the user's own vehicle exits from parking and merges with, and the position of the user's own vehicle, and
    wherein the assist continuation determining unit is further configured to set the predetermined distance subsequent to the determination that the user's own vehicle is capable of exiting from parking and wherein the predetermined distance is set according to a predefined relationship in which the predetermined distances becomes shorter as an angular difference between an orientation of the user's own vehicle at the assist starting position and an orientation of the user's own vehicle at a current position of the user's own vehicle becomes greater, or as an angular difference of the orientation of the user's own vehicle at the current position of the user's own vehicle with respect to the lane becomes greater.

2. The parking exit assist device according to claim 1, wherein when the user's own vehicle has traveled forward from the predetermined position by the predetermined distance, the assist control unit is further configured to determine the state for terminating the assist control in a case where the front detection unit cannot detect the frontward distance, or in a case where the detected frontward distance exceeds a predetermined threshold value.

3. The parking exit assist device according to claim 2, further comprising an assist continuation determining unit configured to determine the state for terminating the assist control, in an event it was determined to continue the assist control by the assist control unit, and the user's own vehicle has traveled forward from the predetermined position by the predetermined distance.

* * * * *